United States Patent
Meyer et al.

(10) Patent No.: US 9,143,282 B2
(45) Date of Patent: Sep. 22, 2015

(54) UPLINK HYBRID-ARQ MECHANISM FOR COOPERATIVE BASE STATIONS

(75) Inventors: Michael Meyer, Aachen (DE); Henning Wiemann, Aachen (DE); Laetitia Falconetti, Aachen (DE); Christian Hoymann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 176 days.

(21) Appl. No.: 13/264,561

(22) PCT Filed: Jul. 27, 2009

(86) PCT No.: PCT/EP2009/059677
§ 371 (c)(1),
(2), (4) Date: Mar. 2, 2012

(87) PCT Pub. No.: WO2010/105702
PCT Pub. Date: Sep. 23, 2010

(65) Prior Publication Data
US 2012/0147815 A1 Jun. 14, 2012

Related U.S. Application Data

(60) Provisional application No. 61/161,924, filed on Mar. 20, 2009.

(51) Int. Cl.
*H04W 72/04* (2009.01)
*H04L 1/18* (2006.01)
*H04B 7/02* (2006.01)

(52) U.S. Cl.
CPC .............. *H04L 1/1812* (2013.01); *H04B 7/022* (2013.01); *H04L 1/1822* (2013.01); *H04L 1/1829* (2013.01)

(58) Field of Classification Search
None
See application file for complete search history.

(56) References Cited

U.S. PATENT DOCUMENTS

| | | | |
|---|---|---|---|
| 2005/0249120 A1* | 11/2005 | Heo et al. ...................... | 370/236 |
| 2009/0185479 A1* | 7/2009 | Hart et al. ...................... | 370/218 |
| 2009/0257408 A1* | 10/2009 | Zhang et al. .................. | 370/336 |

(Continued)

FOREIGN PATENT DOCUMENTS

| EP | 1 594 246 A2 | 11/2005 |
|---|---|---|
| WO | WO 2008/039126 A1 | 4/2008 |
| WO | WO 2008/040930 A1 | 4/2008 |

OTHER PUBLICATIONS

Alcatel-Lucent. Impact of UL CoMP to HARQ Operations, R2-092196., 3GPP TSG RAN WG2 Meetina #65bis, pp. 1-2. Mar. 17, 2009.*

(Continued)

*Primary Examiner* — Huy D Vu
*Assistant Examiner* — Teisha D Hall

(57) ABSTRACT

Method for performing a feedback process between a network access node and a user terminal, comprising collecting supporting information and suspending a transmission of a transport block until the supporting information is collected and/or a decision is taken as to whether request either a new transmission or a retransmission. The method may be performed in a serving network node cooperating with supporting network nodes, receivers or antennas, wherein a first part of the information of the transport block is gathered from a receiver or antenna within the serving network node and a second part of the information of the transport block is gathered from one of the supporting network nodes, receivers or antennas.

20 Claims, 8 Drawing Sheets

(56) References Cited

U.S. PATENT DOCUMENTS

2010/0097978 A1* 4/2010 Palanki et al. ............... 370/315
2010/0107028 A1* 4/2010 Gorokhov et al. ........... 714/748
2011/0044195 A1* 2/2011 Wiemann et al. ............ 370/252

OTHER PUBLICATIONS

Alcatel-Lucent. Impact of UL CoMP to HARQ Operations, R2-092196., 3GPP TSG RAN WG2 Meeting #65bis, pp. 1-2. Mar. 17, 2009.

* cited by examiner

UPLINK HYBRID-ARQ MECHANISM FOR COOPERATIVE BASE STATIONS

This application claims the benefit of U.S. Provisional Application No. 61/161,924, filed Mar. 20,2009, the disclosure of which is fully incorporated herein by reference.

TECHNICAL FIELD

The present invention relates to a method of performing a feedback process between a network access node and a user terminal, and a network access node being adapted to perform this method, as well as an according user terminal.

BACKGROUND

The uplink transmission of a user terminal can be received in general at several base-stations (multi-point reception), although typically a single base station controls the uplink transmission of that terminal. Traditionally, the intended receiver for that transmission is this controlling base station.

For example in UMTS a technique denoted as macro-diversity is employed. Inter-NodeB macro-diversity (soft handover) means that the signal is received and detected at more than one base station and the related information from all involved base stations is exploited at a central node (in the case of UMTS, at the radio network controller (RNC)). With intra-NodeB macro-diversity (softer handover) information received in different cells, which are all served by the same base station, is combined and exploited internally at that particular base station.

An emerging technique is to utilize received signals from different base stations (cooperative base stations). Similar to inter-NodeB macro-diversity this decreases the block error rate and increases the spectral efficiency of transmissions. However, the inter-NodeB macro-diversity requires UE involvement whereas cooperative base stations are transparent to the terminal. In 3GPP LTE-Advanced BS cooperation is being discussed as inter-eNB coordinated multi-point transmission and reception (CoMP), as e.g. specified in 3*GPP TR* 36.814, *3rd Generation Partnership Project; Technical Specification Group Radio Access Network; Further Advancements for E-UTRA Physical Layer Aspects, V*0.3.1, January 2009.

According to this document, intra-eNB CoMP is also being discussed for LTE-Advanced. There, cooperation is based on multiple antennas, which logically belong to the same eNB or even the same cell. These antennas may be geographically separated. With intra-eNB CoMP the signals from different antennas do not need to be exchanged between base stations. However, the exchange of information between the antennas and the base station introduces delays, too.

Since base stations or the cell controllers of multiple cells within a base station are typically physically separated, the information exchange between them introduces a certain delay. Depending on the deployment and the connectivity among cell-controllers the delay may be e.g. in an order of a few μs to several ms.

State-of-the-art wireless access systems typically employ an Automatic Repeat Request mechanism, e.g. a Hybrid Automatic Repeat Request (HARQ) mechanism, at the link layer to increase the spectral efficiency of the system. Such a mechanism uses feedback messages sent from the data receiver to the data sender in order to trigger retransmissions if the previous transmission failed. Incremental Redundancy and Chase Combining are two typical strategies to combat such transmission errors.

In order to minimize the transmission cost and the delays of the ARQ respectively HARQ feedback, state-of-the-art ARQ/HARQ mechanisms employ a fixed timing relation between the transmission of the signal (from the sender to the receiver) and the transmission of the ARQ/HARQ feedback (from the receiver to the sender). The fixed timing replaces other references between the transmitted signal and the corresponding feedback such as a sequence number, which require significantly more transmission resource.

As explained above, state-of-the-art radio ARQ/HARQ protocols typically assume a fixed and constant round trip time (RTT) of the ARQ/HARQ protocol. An example for this is the HARQ protocol in LTE as defined in the MAC protocol specification (3*GPP TS E-UTRA MAC Specification* 36.321). For LTE FDD the HARQ RTT is 8 ms, see the time between the $1^{st}$ transport block and the redundancy version in FIG. 1. For LTE TDD the HARQ RTT varies depending on TDD configurations and on other timing aspects, but is also predetermined.

It is also specified for LTE that the HARQ feedback needs to be sent after a certain number of TTIs (or equivalently subframes). For example for LTE FDD the feedback needs to be sent 4 TTIs after the transmission, see FIG. 1. This means there are tight timing constraints for the uplink HARQ protocol operation.

If the concept of cooperative base stations shall be realized in the LTE, HARQ timing puts very tight delay requirements on the transmission and processing delays between physically separated receivers (base stations or geographically separated antennas/cells). Connections with very low delay (e.g. dedicated optical fiber) is typically very costly while inexpensive solutions do not fulfill the HARQ timing requirements.

FIGS. 2 and 3 show examples of a message sequence chart of cooperating BSs in the context of LTE FDD.

In FIG. 2, the serving base station (BS) sends a request for support to the supporting base station (BS), subsequent to which reception (Rx) of the transmission takes place in both the serving BS and the supporting BS. After having received the transmission, the supporting BS processes the signal and responds to the serving BS. Especially the transfer of the response message (information resp. IQ data transfer) is expected to be time consuming. Having received the response (information transfer), the serving BS needs to combine its own reception and the reception of the supporting BS (processing step). HARQ feedback is then transmitted by the serving BS after 4TTIs. Depending on the actual implementation, a potentially late request and additional processing prior to the request (shown in dashed lines) consumes time as well.

According to FIG. 3, a main receiver (main RX) and a cooperating receiver (comp RX) cooperate in decoding transmitted data. After uplink (UL) scheduling in TTI n−1, transmission is granted and the request for cooperation is sent to the cooperating receiver in TTI n. In TTI n+4, data transmission takes place, subsequent to which processing of the received signal (e.g. A/D conversion, FFT etc.) has to take place in both receivers (TTI n+5). Then, the IQ data is transferred according to the cooperation procedure, and processing, decoding etc. takes place. In TTI n+8 (i.e. 4 TTIs after data transmission as specified according to the HARQ protocol), the feedback, namely acknowledgement (ACK) or negative acknowledgement (NACK) is sent.

Therefore, it is in most cases not possible to use the concept of cooperating base stations, since the delay constraints can not be met with the typically employed transmission infrastructure between base stations, e.g. microwave links, Ethernet, DSL, E1/T1, etc. Note that, regardless of the number of TTIs mentioned in the examples herein, which may be different for different transmission systems, in any case time constraints are introduced by the mentioned feedback process.

SUMMARY

The aim of the present invention is to overcome the mentioned problems, particularly to enable the use of the concept of cooperating base stations while employing a feedback process, e.g. a HARQ feedback process.

According to the invention, there is provided a method of performing a feedback process between a network access node and a user terminal, comprising collecting supporting information and suspending a transmission of a transport block until the supporting information is collected and/or a decision is taken as to whether request either a new transmission or a retransmission, as well as a method of controlling a feedback process in a network access node receiving transmissions of transport blocks from a user terminal, comprising causing the user terminal to suspend transmission of a transport block until supporting information for decoding this or a previous transport block is received and/or a decision is taken as to whether request either a new transmission or a retransmission.

According to the invention, there is further provided a network access node, comprising a receiver for receiving transmissions of transport blocks from a user terminal, a transmitter for sending messages to a user terminal and a receiver for receiving supporting information, said network access node being adapted to perform the above method. Further, there is provided a user terminal, comprising a transmitter for sending transmissions of transport blocks to a network access node and a receiver for receiving messages from a network access node, said user terminal being configurable to suspend transmission of transport blocks in a multi-point reception environment.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1:
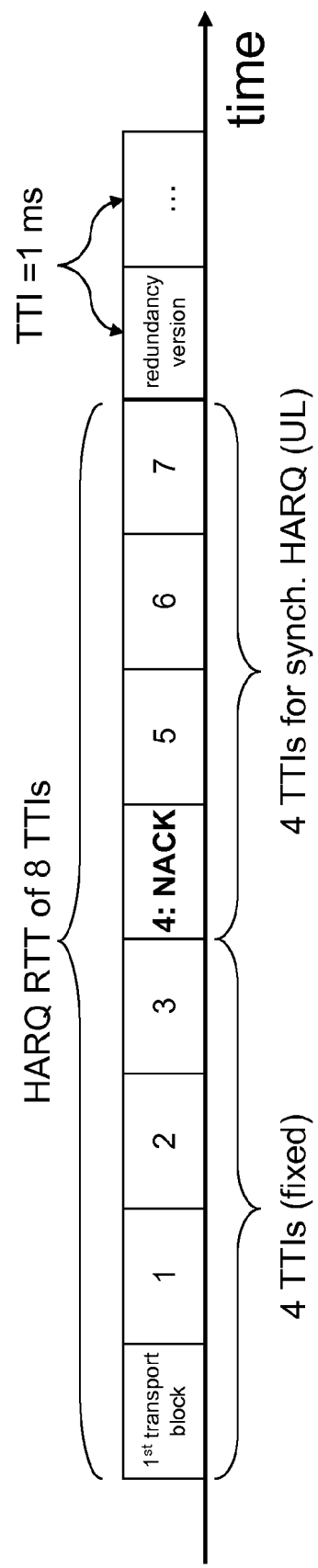
FIG. 1 shows a HARQ timing scheme for LTE FDD uplink.

The following abbreviations may be used:
PDCCH Physical Downlink Control Channel
PHICH Physical HARQ Indicator Channel
C-RNTI Cell Radio Network Temporary Identifier
HARQ Hybrid Automatic Repeat reQuest
MAC Medium Access Control
TTI Transmission Time Interval
UE User Equipment
FDD Frequency Division Duplex
TDD Time Division Duplex
RB Resource Block
BS Base Station
eNB enhanced (evolved) NodeB
NDI New data indicator
CoMP Coordinated multi-point transmission and reception The method, network access node and user terminal described herein can be employed in a wireless communication system in which a sender transmits a data unit which multiple receivers attempt to receive and forward to a controlling receiver, to thereby increase the probability that the controlling receiver can successfully decode the data unit. The system further comprises a feedback mechanism (e.g. a Hybrid ARQ mechanism) that returns a feedback about successful or unsuccessful reception of the received data unit from the controlling receiver to the sender. The wireless communication system may be WCDMA, WiMAX or LTE or any other radio system. The sender may be a user terminal and reception may take place at multiple cells of the same base station (BS) or at cells of different base stations. In any case the devices receiving the signal may be physically separated.

The above-mentioned method of performing a feedback process is based on the idea to suspend the transmission of a transport block in a certain HARQ process that has been selected for cooperation between base stations until the supporting base stations have provided the supporting information and the serving base station has exploited this information and decided to request either a new transmission or a retransmission.

The same principle can be applied when one single BS (in the role of the serving base station) receives delayed signals from one or a plurality of geographically distributed receivers or antennas (in the role of the supporting base stations).

The above method may be performed in a serving network node cooperating with supporting network nodes, receivers or antennas, wherein a first part of the information of the transport block is gathered from a receiver or antenna associated with or within the serving network node and a second part of the information of the transport block is gathered from one of the supporting network nodes, receivers or antennas. As is known to a person skilled in the art, an antenna associated with or belonging to a network node may be physically separated from the network node and connected to this network node e.g. by an optical fiber link. Such a separated antenna may logically be regarded as being within the associated network node.

The mentioned feedback process may, among others, be a HARQ process.

The suspension of the feedback (HARQ) process provides enough time to receive and process the supporting information. After the information is processed the feedback (HARQ) process operation is resumed.

This allows to significantly enhance the transmission quality. For example the block error rate can be decreased, and the spectral efficiency or the system capacity can be increased.

As will further below be explained with more detail, the suspending of the feedback process may be achieved by sending a positive acknowledgement, particularly when a HARQ process is employed.

The method may further comprise receiving and processing the supporting information, and resuming the feedback process after the processing of the supporting information.

It may be considered to start decoding of the transport block without having collected the supporting information; in this case, the feedback process has to be suspended only if the decoding without supporting information was not successful.

A plurality of transport blocks may be used per feedback process. In this case, the same transport block can be transmitted in a plurality of consecutive TTIs. It may be advantageous to interlace the transmission of a second transport block while a cooperation transmission and processing is ongoing.

Accordingly, transmission resources unused due to said suspending may be used for transmission of another transport block, e.g. by interlacing the transmission of two or more transport blocks.

Additionally or alternatively, transmission of a transport block may be suspended in a first feedback process and transmission resources unused due to said suspending are used for transmission of a second feedback process. In this case, said first feedback process may be transmitted by a first user terminal and said second feedback process may be transmitted by a second user terminal. Also, a plurality of feedback processes from one user terminal may be interlaced.

In any case, the transmission of a second transport block may be interlaced while a first transport block has been suspended while transmission and processing of said supporting information is ongoing.

For the interlacing of transport blocks and/or feedback (HARQ) processes, particularly the following possibilities are given:
1. Interlacing of a plurality of transport blocks of one single feedback (HARQ) process (from one single user terminal),
2. Interlacing of a plurality of transport blocks of different feedback (HARQ) processes from one single user terminal, and
3. Interlacing of a plurality of transport blocks (of different feedback (HARQ) processes) from different user terminals.

In all cases, the term "plurality" may comprise any number of two or greater. When different feedback (HARQ) processes are interlaced (in cases 2 and 3), two or more processes may be comprised.

Interlacing generally allows delaying execution of the feedback process thus extending the time available for receiving and processing the supporting information in order to decode the information of one transport block, while leaving less or no unused transmission time intervals. In the second case, one user terminal thus experiences a higher overall data rate, while in the third case the data rate experienced by a single user terminal is not necessarily improved, while the transmission resources of a transmission medium (e.g. of a radio network cell) are used more efficiently. Of course, also a combination of the three cases or of a subset thereof may be employed.

When interlacing is used, optionally either one transport block or two transport blocks can be transmitted in a single transmission time interval (TTI). This may e.g. be used for a MIMO setting.

Further, a control signalling to control the transmission of a plurality (e.g. two) transport blocks can be provided (e.g. for the cooperation case). It can also be provided a (PDCCH) signalling to enable addressing each of the plurality (e.g. two) of transport blocks and/or different (e.g. two) transport blocks that shall be interlaced using a single feedback (HARQ) process.

It may be considered providing a flag to signal whether a new transmission or a retransmission should be sent, and/or a flag that allows addressing either transport block.

The user terminal and the network access node may autonomously toggle among two transport blocks. This may e.g. be provided for when using a MIMO setting.

Further, the same transport block may be transmitted in a plurality of consecutive transmission time intervals (TTI bundling). Such transmission of a transport block in a plurality of consecutive transmission time intervals implicitly delays a retransmission of the same transport block. This allows the serving node to receive and process the supporting information and to take a decision whether to request either a new transmission or a retransmission.

Of course, such TTI bundling may also be combined with interlacing; in this case, two or more bundles of transport blocks (each belonging to one feedback (HARQ) process) may again be interlaced according to one of the cases described above.

It has further been proposed that cooperative base stations exchange the sampled complex signal values from multiple receiving base stations to allow more enhanced signal processing, cf. Hoymann, Falconetti, Gupta, "*Distributed Uplink Signal Processing of Cooperating Base Stations based on IQ Sample Exchange*", *ICC conference*, Dresden, Germany, June 2009 (published after the priority date of the present application). Alternatively base stations exchange coded soft information of the coded bits or the coded bits, cf. Falconetti, Hoymann, Gupta, "*Distributed Uplink Macro Diversity for Cooperating Base Stations*", *International Workshop on LTE Advanced*, Dresden, Germany, June 2009 (published after the priority date of the present application).

LTE scheduling and HARQ are interworking such that, if the radio access node (eNB) is aware of a user equipment (UE) that has data available for transmissions, it sends an uplink grant (e.g. PDCCH uplink grant) to signal to the UE when and how to perform a transmission. The HARQ process to be used is tied to the timing of this (PDCCH) grant.

The UE sends a transport block on the radio resources assigned in the uplink grant and then waits for HARQ feedback and continues to listen (to the PDCCH) for further grants or assignments.

In particular for LTE FDD, the UE listens for PHICH and PDCCH in the fourth TTI after the data transmission.

Further details can be drawn from 3GPP 36.213 E-UTRA MAC Specification.

With inter-eNB CoMP (cooperation work), the serving base station sends a request for support to a neighboring base station (supporting BS). This request could be on a permanent basis, or per uplink transmission. The timing of the request is not very time critical, but it should arrive well in time in order to allow the supporting base stations to receive the expected transmission, i.e. it has to listen for the respective radio resources in the respective TTI.

When the transmission took place and the supporting base station (e.g. an eNB) has processed the data up to the desired level (e.g. FFT, demodulation, decoding, etc.) it sends the requested information to the serving base station (eNB). This can be either IQ data, coded soft bits or even decoded data.

The LTE HARQ protocol is specified in a way that if the serving base station (eNB) sends a HARQ ACK on the PHICH channel, the corresponding HARQ process does not perform a retransmission unless a corresponding PDCCH grant overrides this and requests a retransmission. This means that an isolated ACK tells the HARQ process to keep the related information, i.e. the transport block and the state variables, in the buffer. This enables to resume this HARQ process at a later point in time, i.e. a suspension of the HARQ process is effected.

In particular, a PDCCH uplink grant that signals a retransmission resumes the operation of this HARQ process. Alternatively, a PDCCH grant requesting a new transmission results in a HARQ buffer flush and a reset of the corresponding state variables. After that this HARQ process is used for the transmission of new data.

In LTE the eNB (serving base station) might always be able to send an ACK to suspend an uplink HARQ process. It is known that when receiving an ACK the UE does not flush its HARQ process because the ACK could have been a NACK (ACK-NACK error). The eNB may send an ACK on purpose just to suspend the HARQ process (e.g. when the retransmission would collide with RACH, paging or a measurement gap).

Further details can be drawn e.g. from 3*GPP specifications* 36.321 (*E-UTRA MAC Specification*) and 36213 (*E-UTRA Physical Layer Procedures*).

Figure 4:
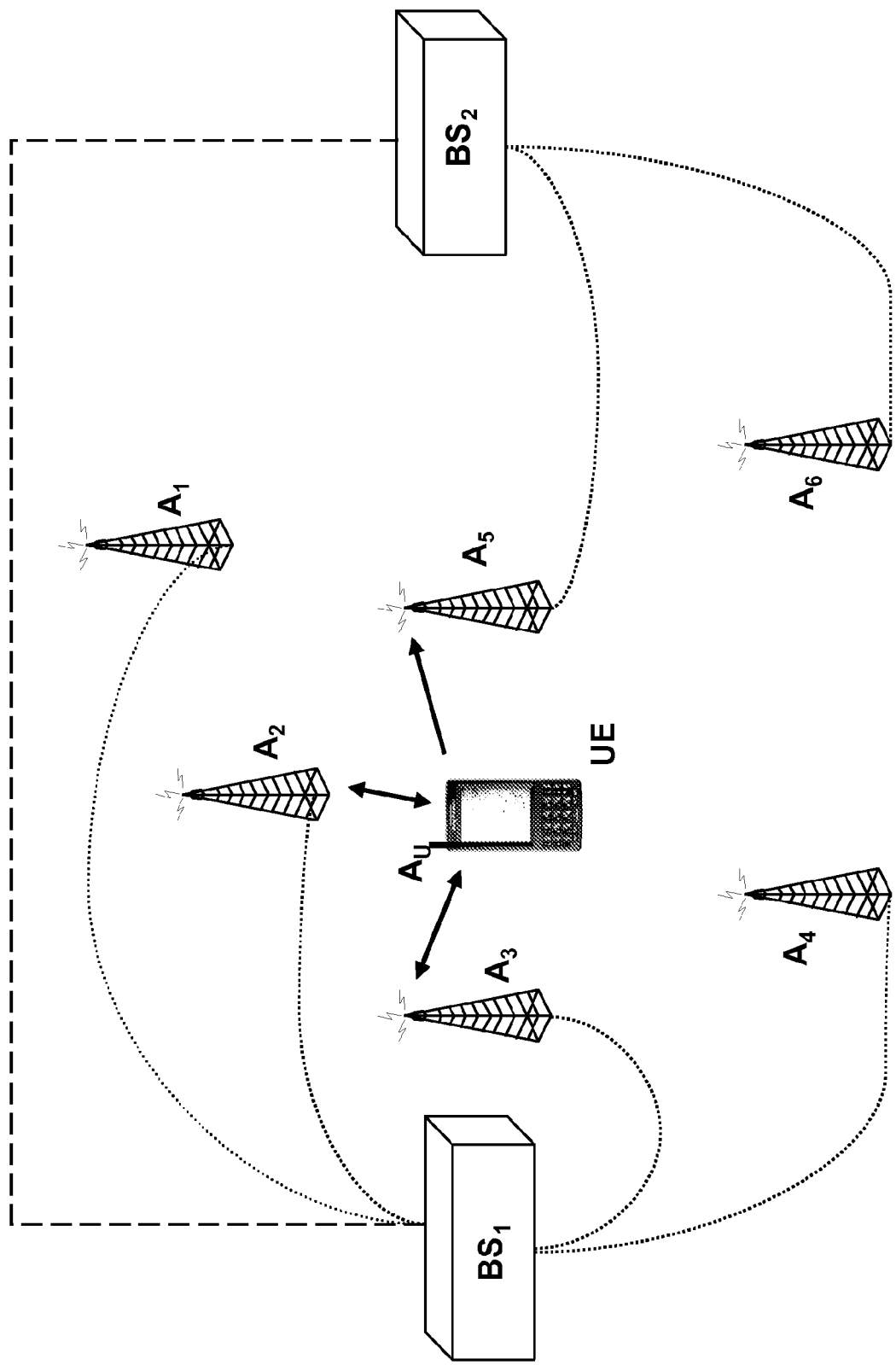
FIG. 4 shows an exemplary CoMP environment in a mobile communications network.

An exemplary CoMP environment is shown in FIG. 4. Here, two base stations $BS_1$ and $BS_2$, each having assigned several antennas $A_1$ to $A_4$ ($BS_1$), respectively $A_5$ and $A_6$ ($BS_2$), communicate with a user terminal UE. The base stations $BS_1$ and $BS_2$ are to be regarded as being network access nodes and may e.g. be eNBs in the case of LTE. The respective antennas $A_1$ to $A_6$ act as receivers for data (transport blocks) transmitted by user terminal UE, and as transmitters for messages sent to user terminal UE, e.g. control signalling, feedback messages etc., and of course also for payload data being sent to the user terminal UE.

As is shown in FIG. 4, each base station may have several antennas assigned (indicated by dotted lines), however it is also possible that each base station has only one antenna, e.g. antenna $A_2$ for base station $BS_1$ and antenna $A_5$ for base station $BS_2$. The base stations $BS_1$ and $BS_2$ are connected by a communications link corresponding to the aforementioned transmission infrastructure, indicated as a dashed line, which may e.g. be a microwave link, Ethernet, DSL, E1/T1, etc. User terminal UE is also equipped with an antenna $A_U$ acting as transmitter for data (transport blocks) in the uplink to one or more base stations, and as receiver for data, signalling and other messages from a base station.

It will be appreciated by a person skilled in the art, that the terms "transmitter" and "receiver" used herein not necessarily only comprise an antenna, but may also comprise circuitry for generating resp. sensing the electromagnetic signals to be transmitted and received, possibly with according power amplifiers etc., and may also comprise means for at least basic processing of those signals, e.g. modulating/demodulating, filtering, encoding/decoding etc., which may comprise hardware structures as well as software functions being executed thereon. The reproduction of these elements has been omitted in the figures for sake of clarity. Further, these elements may be located, at least partly, with the respective antenna, or may be distributed between the antenna and the assigned base station. Each antenna may be located at or within the respective base station, or may be located separate from it, resulting in geographically distributed antennas, as is depicted in FIG. 4.

In the example shown in FIG. 4, antennas $A_2$, $A_3$ (assigned to base station $BS_1$) and $A_5$ (assigned to base station $BS_2$) are in the reception/transmission range of user terminal UE and are thus capable to receive data (transport blocks) from this user terminal UE. In this example, base station $BS_1$ controls the communication with user terminal UE and the process of multi-point reception and cooperation and may as such be regarded as controlling or serving base station or network node. This fact is indicated by the arrows between the respective antennas and the user terminal UE, which in case of antennas $A_2$, $A_3$ (assigned to base station $BS_1$) are bidirectional, i.e. between base station $BS_1$ and user terminal UE communication in both directions takes place, while it is unidirectional for antenna $A_5$ (assigned to base station $BS_2$), i.e. only transmission from the user terminal UE to base station $BS_2$ takes place. Of course, this situation is not necessarily static, and another base station, e.g. base station $BS_2$, could take over control of the process, e.g. as user terminal UE moves, and would then be the controlling or serving base station or network node.

Serving base station $BS_1$ receives information regarding transmitted data (transport blocks) from different sources, namely from antennas $A_2$ and $A_3$ directly assigned to it and from base station $BS_2$ via the communications link (dashed line). At least the information received from base station $BS_2$ may be regarded as being supporting information.

Of course, the process as described herein is also applicable if base station $BS_2$ is not involved, but base station $BS_1$ receives information regarding a transport block transmitted by user terminal UE from a plurality of antennas assigned to itself, e.g. antennas $A_2$ and $A_3$. In this case, the information received via one or more of these antennas may be regarded as being supporting information.

Figure 2:
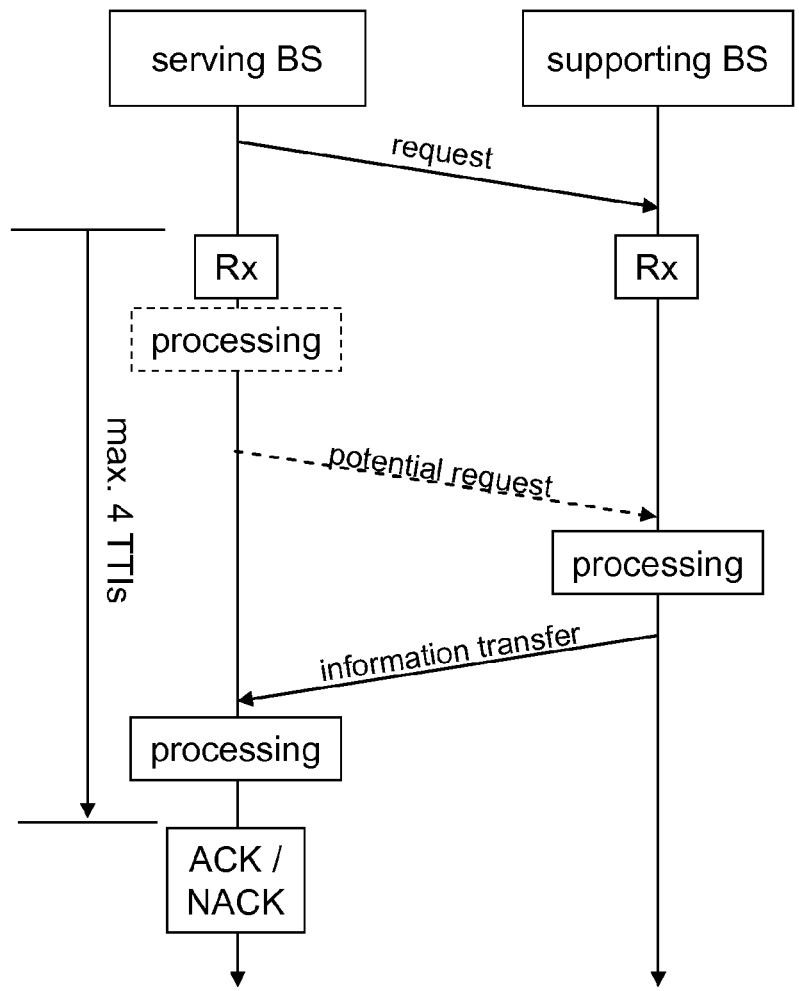
FIG. 2 is a signalling diagram showing uplink HARQ timing aspects of LTE FDD in the context of cooperating base stations.
Figure 3:
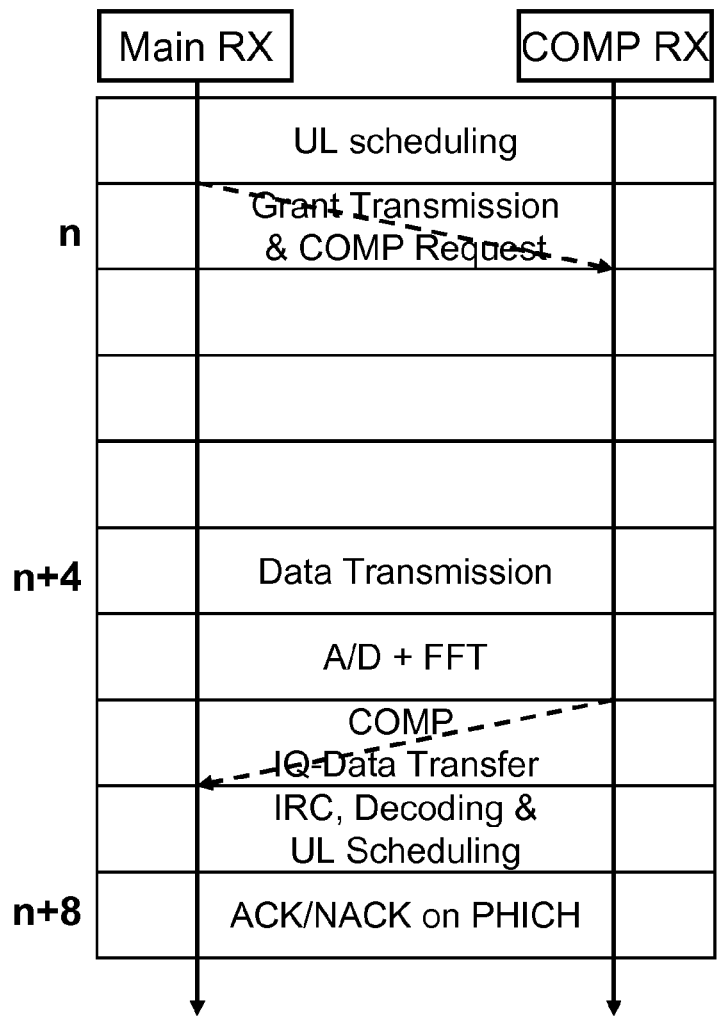
FIG. 3 shows communication flow in a coordinated multi-point transmission and reception (CoMP)

In the following, it will be assumed that cooperation has been requested according to FIG. 2 resp. FIG. 3. Also the data transmission has been triggered (e.g. by a PDCCH grant) and the transmission took place. The transmission from the UE has been received by the involved base stations. It will be assumed further that the infrastructure does not allow sending the supporting information within the delay budget of the HARQ protocol, e.g. less then 3 ms for LTE FDD, since also some time for processing in the controlling node is required. It is to be noted that these assumptions shall not limit the scope of the invention, but that they are used to facilitate the description of the embodiments described below.

Figure 5:
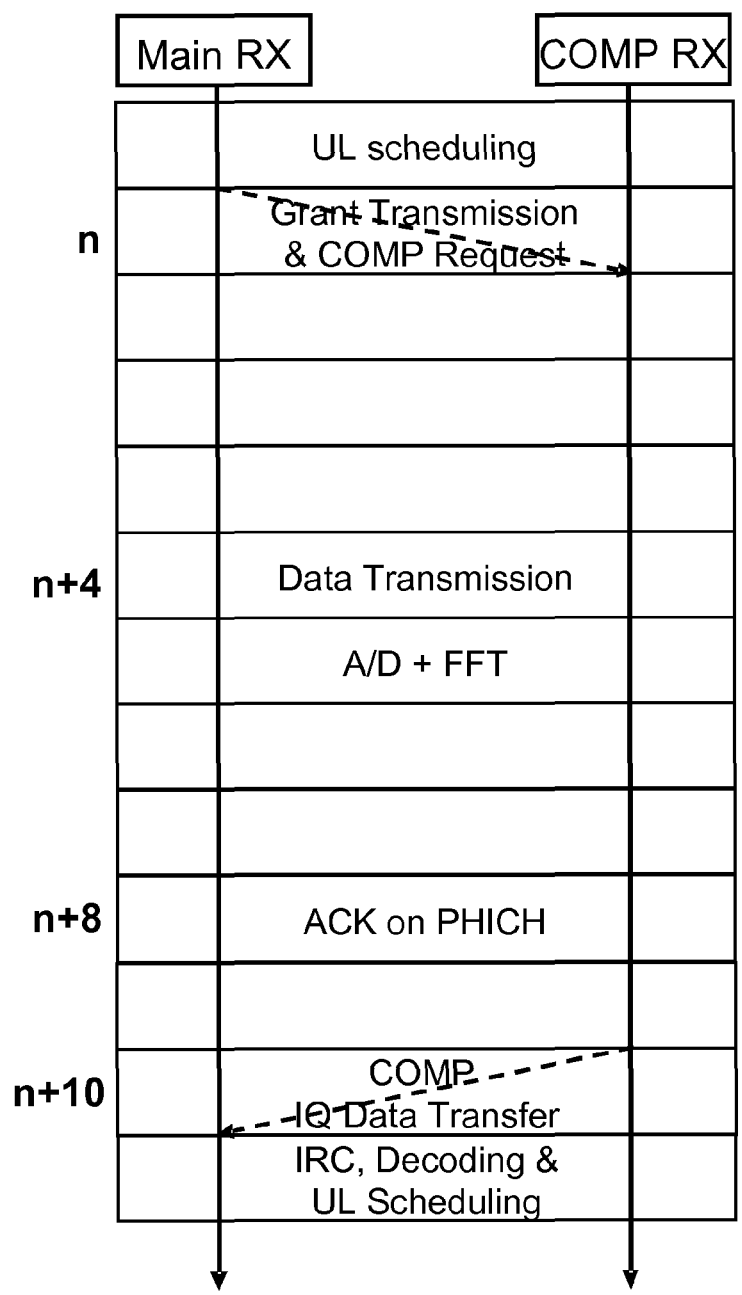
FIG. 5 shows a communication flow in a coordinated multi-point transmission and reception (CoMP) with suspension of transmission.

FIG. 5 shows communication flow in a coordinated multi-point transmission and reception (CoMP) similar to FIG. 3. In this case, however, supporting data (IQ data) from the supporting base station (comp RX) is not received by the controlling or serving base station (Main RX) within the time required for giving adequate feedback in the HARQ process. Therefore, as the serving base station was not able to successfully decode the information of the transport block (data transmission of TTI n+4), it causes the user terminal to suspend transmission in the current feedback (HARQ) process, in the example shown by sending a positive acknowledgement (ACK) to the user terminal. Of course, such suspending could also be caused by other means, e.g. by an announcement to the user terminal that a cooperation between base stations takes place and therefore all transmissions have to be suspended unless explicitly demanded, or by dedicated signalling.

Figure 6:
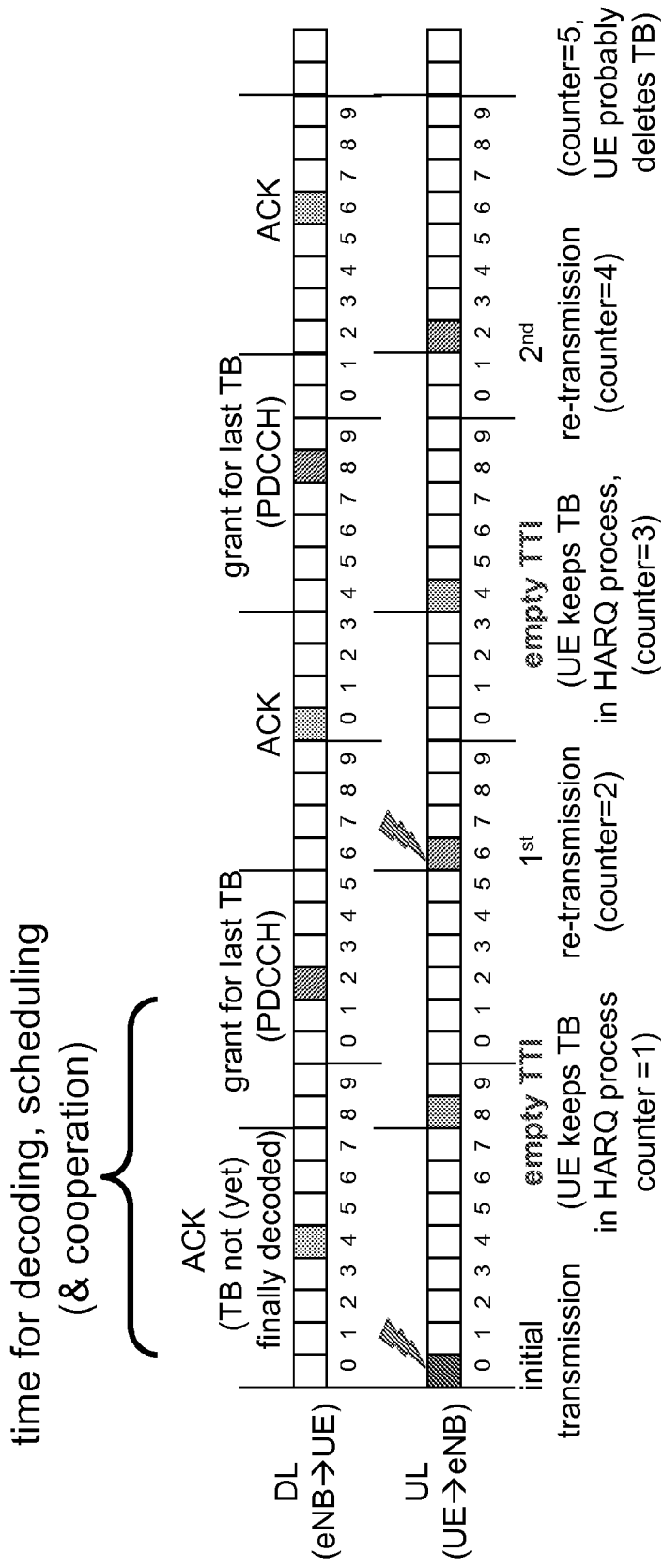
FIG. 6 shows a HARQ operation with cooperation.

In a first embodiment (embodiment 1) the serving base station sends a HARQ ACK (e.g. on PHICH) to the terminal independent of the success of the actual reception, see FIGS. 5 and 6. Based on the HARQ ACK the UE does not perform a retransmission for the corresponding HARQ process. However, it keeps the data in the HARQ buffer and adjusts the state variables for this HARQ process (e.g. increments the variable that counts the HARQ transmissions (CURRENT_TX_NB)).

In parallel to the (suspended) HARQ operation the serving base station (eNB) receives the supporting information from the one or more supporting base stations and performs a joint processing of the locally received information and the supporting information. This can be, for example, that coded soft bits from all sources are used in the decoding process. Another possibility is that IQ data from all sources is used for demodulation and to derive the coded soft bits that are then fed into the channel decoder.

Once the processing has been done, it can be decided whether the transmission has been correctly received or not. In the latter case, another retransmission may be requested from the mobile terminal.

According to exemplary parameters, cooperation (including potential decoding, scheduling of the subsequent transmission) has to be completed within 11 TTIs, see FIG. 6.

In any case, now the correct HARQ feedback is sent on PHICH, an ACK in case of successful reception and a NACK in case of not successful reception.

In addition, a corresponding PDCCH uplink grant is sent that either requests a retransmission, the next transmission, or nothing for this terminal.

As can be seen from FIG. 6, in TTI 0 the user terminal (UE) sends the initial transmission of a transport block (TB, dark square) on the uplink (UL), followed by an acknowledgement (ACK) on the downlink (DL) from the base station (eNB), which is sent in order to suspend the HARQ process as the TB has not yet been fully decoded. Accordingly, the UE keeps the TB in the HARQ process and does not perform any transmission in TTI 8 (empty TTI, hatched). In following TTI 2, the eNB sends a grant for the last TB (on the PDCCH DL channel), which means that this TB (initially sent in TTI 0) could not be decoded, followed in TTI 6 by the according first retransmission (hatched). Again, in next TTI 0 an ACK follows in order to suspend transmission, resulting in another empty TTI 4 (hatched), and another grant for the last TB in TTI 8, which is retransmitted for the second time in following TTI 2 (hatched) and again answered by an ACK in TTI 6.

Within this embodiment two exemplary variants will be described:

1. The serving base station (eNB) starts to decode the data without support from the supporting base station. If the data is successfully decoded, a HARQ ACK and potentially a PDCCH uplink grant are sent to request a new transmission. If the data is not successfully received based on the information received at the serving base station, the serving base station (eNB) attempts to use the signal received from the supporting base station (receiver) if it became available in time. If it is not available on time, it sends a HARQ ACK, but it is not accompanied by a PDCCH uplink grant. Thereby, the serving base station (eNodeB) re-activates the suspended HARQ process in the following round trip time by providing an uplink grant for a new data transmission if decoding was successful or for a retransmission otherwise.

2. The serving base station (eNB) waits for the supporting data before it starts to process the considered HARQ process, i.e., it does not attempt to decode its own reception before having received the supporting signal. If the transmission of the supporting information exceeds the HARQ timing constraints, a HARQ ACK is sent on PHICH in order to suspend the HARQ process. The serving base station (eNodeB) re-activates the suspended HARQ process in the following round trip time by providing an uplink grant for a new data transmission if decoding was successful or for a retransmission otherwise.

A realization of this embodiment does not require any change to the actual LTE standards. The mechanism can be implemented in the eNB and no change is needed in the UE implementation.

In the variant 2 described above, the feedback is always an ACK after the transmission; hence the ACK does actually not provide any information. If the UE knows by some form of configuration that cooperation between base stations is applied for its transmissions the feedback could be omitted. Corresponding signalling to inform the UE about the cooperation would need to be included in either RRC signalling, PDCCH signalling or other signalling mechanisms (e.g. a specific physical control channel for this purpose).

If even more time is needed for enabling cooperation, this is also possible within the described embodiment. The resuming of the HARQ process can be invoked by a PDCCH grant at any subframe corresponding to the considered HARQ process. In that case, the BS should configure UEs under cooperation to have a larger number of maximum HARQ retransmissions before flushing the process compared to UEs which are served non-cooperatively.

A limitation of this embodiment might be that TTIs cannot be utilized by the given UE while the corresponding HARQ process is suspended (in the second variant every second TTI is empty). However, the serving base station (eNB) could assign the empty resource blocks (RBs) to other UEs. This would improve cell spectral efficiency but not the performance experienced by the particular user. When no other UEs have data or transmit power available for transmission this approach does not provide any other gain than reduced inter-cell interference (no interference in the suspended TTIs).

Another standardized feature, i.e., TTI bundling is proposed in another embodiment (embodiment 2) to gain time for cooperation. The purpose of TTI bundling is to enhance the performance of cell-edge UEs. Such UEs are allowed to transmit the same transport block in a plurality, e.g. 4 consecutive TTIs without waiting for a HARQ feedback. TTI bundling reduces the ratio of signalling overhead to user data. Like that, UEs with limited transmit power can increase the energy per bit of user data and thus increase cell-edge bitrate.

With TTI bundling HARQ feedback is expected only for the last TTI of the bundle, e.g. the 4th one. Like with a regular transmission the HARQ process can be suspended by transmitting an ACK. The scheduling grant to request the retransmission of the last TB or the grant to request the next TB is transmitted a certain number, e.g. 12 TTIs after the first TTI of the bundle. If the serving base station (eNB) transmits a NACK or if it transmits a grant for the last TB, the TB is re-transmitted after a further certain number, e.g. 16 TTIs after the initial transmission, again as a bundle of e.g. 4 TTIs.

TTI bundling in conjunction with the HARQ suspend mode could be leveraged to gain time for cooperation. Like in the first embodiment the serving base station sends a HARQ ACK (e.g. on PHICH) to the terminal independent of the success of the actual reception, see FIG. 7. However, the UE keeps the data in the HARQ buffer. Meanwhile the serving base station (eNB) receives the supporting information from the one or more supporting base stations and performs cooperation. According to the exemplary numbers used above, 12 TTIs after the first transmission the serving base station (eNB) can request the re-transmission of the last TB if the cooperative decoding failed, see FIG. 7. If it the data has been correctly received, the serving base station (eNB) can request the next TB or nothing for this terminal. With this embodiment the serving base station (eNB) has 8 ms to cooperate.

Figure 7:
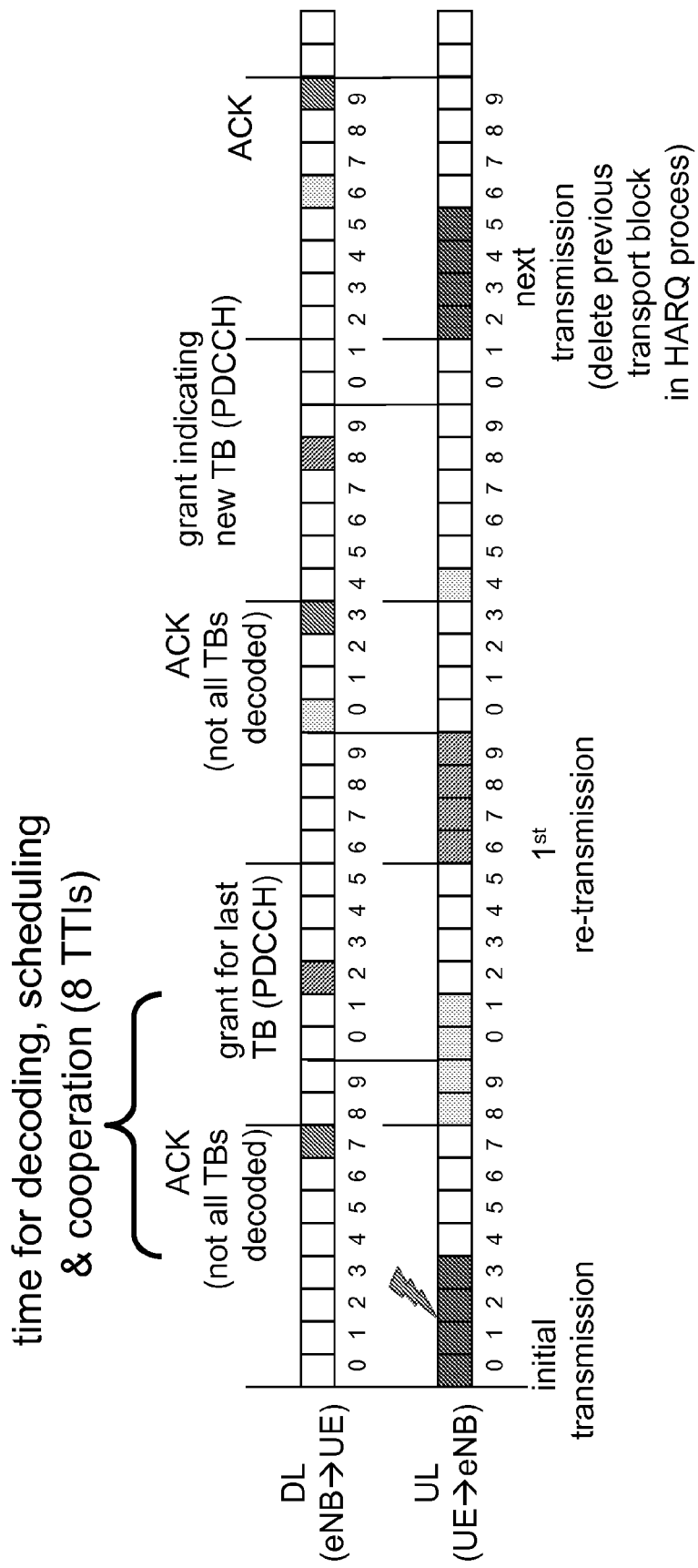
FIG. 7 shows an example of a HARQ operation with TTI bundling.

As is shown in FIG. 7, in TTI 0 a TB is transmitted and autonomously retransmitted in TTIs 1 to 3. The ACK in TTI 7 suspends the HARQ process as the serving eNB could not yet decode the TB and is still waiting for the supporting information. In following TTI 2, a grant for the last TB is sent on the DL PDCCH channel, followed by a retransmission (hatched) in TTIs 6 to 9. As again the TB could not be fully decoded in time, another ACK is sent in next TTI 3, followed by a grant for a new TB (hatched) in TTI 8, indicating that in fact the previous TB could be decoded. Accordingly, the next transmission follows in following TTIs 2 to 5, while the previous TB is deleted.

Compared to the 1st embodiment, the 2nd one has the advantage that no TTIs remain unused but the time for cooperation is slightly shorter (e.g. 8 ms compared to 11ms).

An alternative to the suspend mode could be that the eNB always transmits a NACK instead of an ACK after having received a bundle of TTIs. If the cooperative decoding really failed, the UE will retransmit the bundle without additional signalling (which is good). If the cooperative decoding was successful, the serving base station (eNB) could request the next TB by issuing a scheduling grant for the next TB (with the NDI bit toggled). If the cooperative decoding was successful and the serving base station (eNB) has issued the grant but the UE buffer is empty, then the UE will just send a buffer status report indicating that no data is left. The bundle of TTIs would be unused (which might be less preferred).

One of the advantages of the above-described embodiments is that they can be implemented within current LTE standards. However, the 2nd embodiment is based on TTI bundling which restricts scheduling flexibility by allocating a plurality of consecutive TTIs. Furthermore, current standards, e.g. the *E-UTRA Physical Layer Procedures,* 36.213 limit TTI bundling to small allocations of at most 3 resource blocks and QPSK modulation. These limitations could make it an interesting alternative for cell-edge UEs in poor coverage conditions. However, it might be less suitable in deployments with small cells where even cell-edge users achieve high bit-rates and are expected to achieve even higher bit-rates due to uplink CoMP. The 1st embodiment has the effect that at least in a case where cooperation is needed, one transmission opportunity for the UE is not used that might lead to non-optimal performance.

The following embodiment (embodiment 3) can be regarded to overcome the problem of unused TTIs in the 1st embodiment by an enhanced solution.

This embodiment uses a plurality (e.g. two) transport blocks per HARQ process, which allows interlacing the transmission of the other transport block while the cooperation transmission and processing is ongoing. Thus, this solution has the potential to increase (e.g. doubles in case of FDD) also the HARQ RTT, but unused TTIs (as occurring in embodiment 1) can be utilized by means of this embodiment.

This solution requires that the corresponding control signalling is in place. The concept of having two transport blocks per HARQ process is known from the MIMO transmission mode in LTE for the downlink. Therein, either one or two transport blocks can be transmitted in a single TTI. Uplink multi-stream transmission is not specified so far. Examples for required means for the control signalling in order to control the transmission of the two transport blocks for the cooperation case are:

A signalling (e.g. PDCCH signalling) must enable addressing each of the two transport blocks that shall be interlaced using a single HARQ process. This might involve a flag (e.g. the NDI flag) to signal whether a new or retransmission should be sent and a flag that allows to address either transport block.

Alternatively, the UE and the eNB could autonomously toggle among the two transport blocks if e.g. configured accordingly by RRC.

Figure 8:
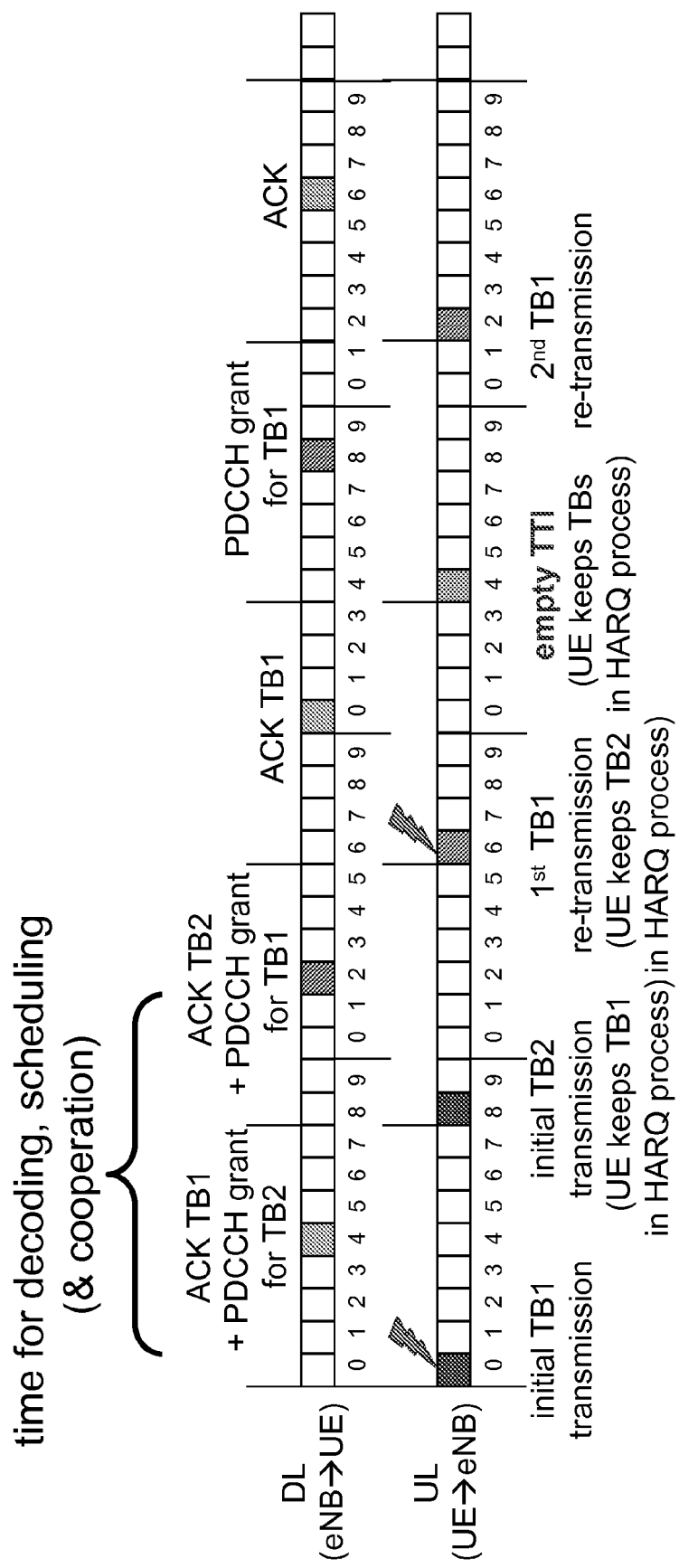
FIG. 8 shows an example of an enhanced HARQ operation with cooperation.

With these means it is possible to alternate between the two transport blocks for the considered HARQ process as shown in FIG. 8.

According to FIG. 8, two transport blocks TB1 and TB2 are interlaced. In TTI 0, TB1 is transmitted, followed by an ACK for TB1 in TTI 4, which suspends the HARQ process for TB1, and is in this case accompanied by a grant for TB2. Following this grant, in TTI 8 initial transmission of TB2 takes place, while TB 1 is kept in the buffer of the HARQ process. In following TTI 2, an ACK for TB2 is sent (suspending this HARQ process), together with a grant for retransmission of TB1, which is sent in TTI 6 ($1^{st}$ retransmission, while TB2 is kept in the buffer). In next TTI 0, an ACK for TB1 is sent (again suspending this HARQ process); as no further grant is sent, probably TB2 has been decoded successfully, and next TTI 4 remains empty. Again, TB1 was not successfully decoded, so that in TTI 8 a new grant for TB1 is sent, repeating the procedure of suspending, decoding etc.

It can be seen that also in this case a TTI remains empty as TB2 was decoded while for TB1 a further retransmission was necessary. Even if not shown in FIG. 8, it is of course conceivable that in such a case transmission of a further transport block (TB3, not shown) could be initiated by the base station (eNB) in order to avoid leaving TTIs empty. With the described procedure, the different TBs which are interlaced can originate from a single user terminal or from two or more different user terminals. This could e.g. be done according to the usual scheduling by the base station, or/and if a first user terminal has no TBs left to transmit apart from the one(s) not yet successfully decoded, and it is thus switched to a second user terminal for the otherwise unused TTIs.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

The invention claimed is:

1. A method of controlling a feedback process in a network access node receiving transmissions of transport blocks from a user terminal, the method comprising:
    receiving a transmission of a transport block from a user terminal;
    sending a message to the user terminal that causes the user terminal to suspend the feedback process while:
    the network access node receives supporting information for decoding the transport block from a supporting base station; and
    the network access node decides whether to request one of a new transmission of another transport block or a retransmission of the transport block,
    the suspension of the feedback process including suspending retransmission of the transport block from the user terminal.

2. The method of claim 1, further comprising receiving and processing the supporting information, and resuming the feedback process after the processing of the supporting information.

3. The method of claim 1, wherein decoding of the transport block is started without having received the supporting information, and the user terminal is caused to suspend transmission due to the decoding without supporting information being unsuccessful.

4. The method of claim 1, wherein transmission resources unused due to said suspending are used for transmission of another transport block.

5. The method of claim 4, wherein transmission of a transport block is suspended in a first feedback process and transmission resources unused due to said suspending are used for transmission of another transport block in a second feedback process.

6. The method of claim 5, wherein said first feedback process is controlled for a transmission by a first user terminal and said second feedback process is controlled for a transmission by a second user terminal.

7. The method of claim 5, further comprising interlacing a plurality of feedback processes from one user terminal.

8. The method of claim 4, wherein one of one transport block, and two transport blocks are transmitted in a single transmission time interval.

9. The method of claim 4, further comprising providing a control signaling to control the transmission of a plurality of transport blocks.

10. The method of claim 4, further providing a signaling to enable addressing each of the plurality of transport blocks that shall be interlaced using a single feedback process.

11. The method of claim 1, further comprising signaling whether one of the new transmission and the retransmission should be sent.

12. The method of claim 1, wherein the same transport block is transmitted in a plurality of consecutive transmission time intervals.

13. The method of claim 1, wherein the feedback process is a hybrid automatic repeat request, HARQ, process.

14. A method of controlling a hybrid automatic repeat request, HARQ, process between an network access node and a user terminal, comprising:
suspending the HARQ process between the network access node and the user terminal while the network access node:
collects corresponding supporting information of a transmitted transport block from a supporting node, the suspending of the HARQ processing including suspending retransmission of the transport block from the user terminal; and
decides, based on the supporting information, whether to request one of a new transmission of another transport block or a retransmission of the transmitted transport block.

15. The method of claim 14, further comprising receiving and processing the supporting information, and resuming the HARQ process after the processing of the supporting information.

16. The method of claim 14, further comprising using a plurality of transport blocks per HARQ process, and interlacing the transmission of a second transport block while the cooperation transmission and processing is ongoing.

17. The method of claim 14, wherein the user terminal is caused to suspend transmission of the transport block by sending a positive acknowledgement to said user terminal.

18. The method of claim 14, wherein the user terminal is caused to suspend transmission of transport blocks by a configuration setting.

19. A network access node, comprising:
at least one receiver configured to receive transmissions of transport blocks from a user terminal;
a transmitter configured to send messages to a user terminal; and
the at least one receiver further configured to receive supporting information corresponding to a transmitted transport block;
the network access node being configured to cause the user terminal to suspend a feedback process while the network access node:
receives supporting information for decoding one of the transport blocks from a supporting node; and decides whether to request one of a new transmission of another transport block or a retransmission of the one of the transport blocks.

20. A user terminal, comprising:
a transmitter configured to send transmissions of transport blocks to a network access node;
a receiver configured to receive messages from a network access node; and
the user terminal being configured to suspend a feedback process, unless continuation of the feedback process is explicitly demanded, based at least in part on one of the messages received from the network access node indicating:
completed cooperation between the network access node and a supporting base station; and
the network access node has decided whether to request one of a new transmission of another transport block or a retransmission of the transport block,
the suspending of the feedback process including suspending retransmission of the transport blocks in a multipoint reception environment.

* * * * *